Jan. 11, 1927.

C. L. OLIN 1,613,717

REFRIGERATOR CONDENSER

Original Filed August 7, 1923

INVENTOR
CARL L. OLIN.
BY
ATTORNEY

Patented Jan. 11, 1927.

1,613,717

UNITED STATES PATENT OFFICE.

CARL L. OLIN, OF OAKLAND, CALIFORNIA.

REFRIGERATOR CONDENSER.

Application filed August 7, 1923, Serial No. 656,279. Renewed September 18, 1926.

My invention is an improved condenser, particularly applicable to refrigerating systems which employ carbon or sulphur dioxide as the refrigerant, and in which oil is pumped with the dioxide. I condense in a closed tank or condenser, the refrigerant and the lubricating oil which is carried with the vapors; and these are separated in the closed tank in accordance with their different specific gravities. The vapors of carbon or sulphur dioxide are injected into a tube extending downwardly into the condenser tank, and are sprayed out through apertures against the cooling coils, the refrigerant and oil settling to the bottom of the tank and separating in accordance with their specific gravities.

The object of my invention is to provide baffle plates and tubes which will assist in the separation of the oil and dioxide. Another object is to thoroughly cool the oil by carrying it through the dioxide prior to its use in the pump.

Other objects and advantages will be more specifically pointed out and described in the following detailed description.

In the annexed drawing in which my invention is illustrated,

Figure 1:
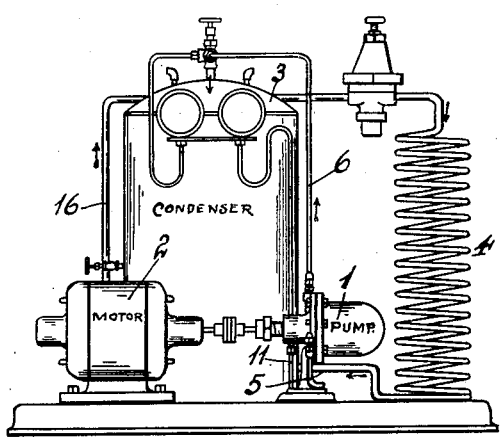
Figure 1 is a side elevation of a refrigerating plant embodying my invention.
Figure 2:
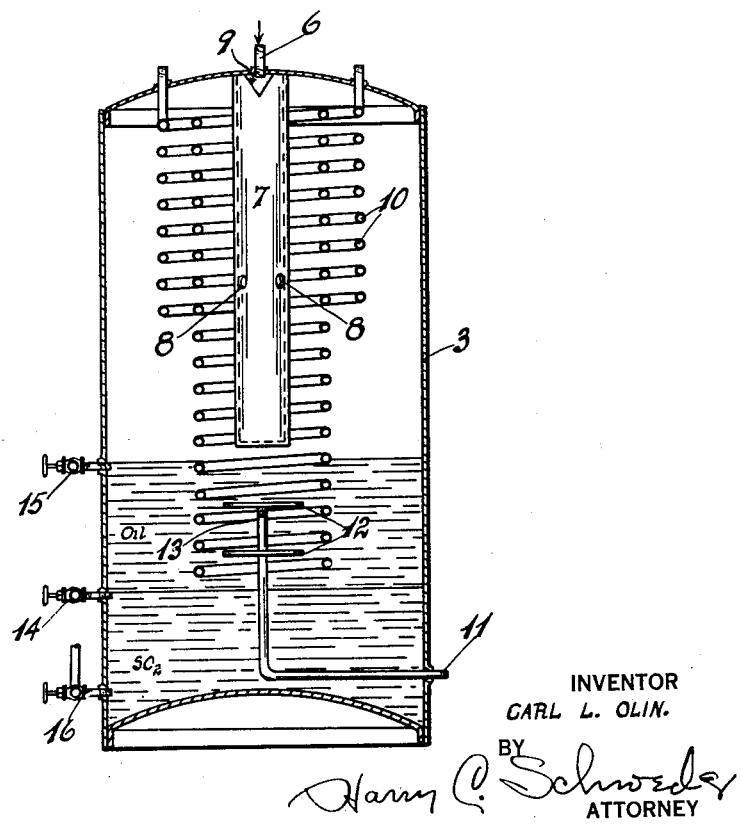
Figure 2 is a transverse sectional view of a condenser.

Referring more particularly to the drawing, my condenser is preferably used in a system which includes a pump 1 driven by a suitable motor 2. The pump is of the rotary type and is sealed with oil which is drawn from the condenser tank 3 as will be further described. The dioxide refrigerant is expanded into the cooling coils 4 and is then drawn into the intake 5 of the pump 1, passes through the pump and is discharged through the pipe 6 into the top of the tank 3.

A tube 7 is suspended in the condenser tank 3 below the pipe 6 and is provided with a plurality of holes 8 in the side thereof and slots 9 in the top thereof. The pump 1 forces the dioxide and oil through the pipe 6 into the tube 7 where it sprays out of the holes 8 and slots 9 against cooling coils 10, which surround said tube, thus separating the oil from the dioxide as well as cooling and condensing the dioxide. The coils 10 extend downwardly below the bottom of the tube 7 into the area occupied by the oil. The dioxide being the heavier falls to the bottom of the tank 3 with the oil resting on the top thereof.

An oil lead 11 enters the tank 3 near the bottom and is bent upwardly at an angle into the oil area. Baffle plates 12 are secured to the top of the pipe 11 and the oil is drawn through a hole 13 into the pipe. The lead 11 extends to the pump 1 and supplies oil to seal the vanes therein.

Taps 14 and 15 are positioned in the tank 3 to indicate the height of the sulphur dioxide and oil respectively.

A pipe 16 is tapped into the lower end of the tank 3 and supplies sulphur dioxide to the coil 4. The object of extending the pipe 11 through the dioxide is to thoroughly cool the oil before it is used in the pump 1. My apparatus is designed to continuously condense and separate a lubricating agent as oil from a refrigerant in the condensing operation, and to draw the oil and the refrigerant separately from the lower part of the tank. The refrigerant requires a much lower temperature to condense it than does the oil and therefore, although the cooling coils 10 operate on both the oil and the refrigerant the oil condenses quicker with the same drop in temperature. If both were allowed to remain in a condensed form in the tank they would probably come to substantially the same temperature, that is the temperature of the refrigerant, but as they are drawn off substantially as rapidly as condensed, the oil will not be as cold as desirable. Therefore, the cooling coils 10 are carried down into the oil and the oil outlet 11 passes downward through the dioxide.

Having described my invention, I claim:

1. A condenser comprising a closed tank, a cylindrical tube depending from the top of said tank, said tube being provided with a plurality of apertures through which the mixture of refrigerant and lubricant is sprayed, coils surrounding said tube, an outlet near the bottom of the tank for the condensed refrigerant, and an outlet pipe for lubricant, extending from a point near the bottom of the tank to a substantially higher level, said pipe being provided with horizontal baffle plates adjacent its upper end.

2. A condenser comprising a tank, a cylindrical tube within said tank, said tube being provided with a plurality of apertures through which a mixture of refrigerant and lubricant is adapted to be sprayed, a coil surrounding said tube, an outlet for the condensed refrigerant, an outlet pipe for the lubricant extending substantially from the bottom of the tank to a higher level, and a baffle plate fixed to the upper end of said outlet pipe.

3. A condenser comprising a tank, a cylindrical tube within said tank, said tube being provided with a plurality of apertures through which a mixture of refrigerant and lubricant is adapted to pass, a coil surrounding said tube, means for passing cooling water through said coil, an outlet pipe extending vertically within said tank, and a baffle plate positioned adjacent the upper end of said outlet pipe.

In testimony whereof I affix my signature.

CARL L. OLIN.